(12) United States Patent
Lin et al.

(10) Patent No.: US 11,948,499 B2
(45) Date of Patent: Apr. 2, 2024

(54) DRIVING CIRCUIT AND DRIVING METHOD

(71) Applicant: AUO Corporation, Hsin-Chu (TW)

(72) Inventors: Rong-Fu Lin, Hsin-Chu (TW);
June-Woo Lee, Hsin-Chu (TW);
Sung-Yu Su, Hsin-Chu (TW)

(73) Assignee: AUO CORPORATION, Hsin-Chu (TW)

(*) Notice: Subject to any disclaimer, the term of this patent is extended or adjusted under 35 U.S.C. 154(b) by 0 days.

(21) Appl. No.: 17/886,810

(22) Filed: Aug. 12, 2022

(65) Prior Publication Data
US 2023/0222961 A1   Jul. 13, 2023

(30) Foreign Application Priority Data

Jan. 11, 2022   (TW) .................. 111101151

(51) Int. Cl.
*G09G 3/32*   (2016.01)
*G09G 3/3233*   (2016.01)

(52) U.S. Cl.
CPC ............ *G09G 3/32* (2013.01); *G09G 3/3233* (2013.01); *G09G 2300/0842* (2013.01); *G09G 2310/0267* (2013.01); *G09G 2310/0275* (2013.01); *G09G 2320/045* (2013.01); *G09G 2330/021* (2013.01)

(58) Field of Classification Search
None
See application file for complete search history.

(56) References Cited

U.S. PATENT DOCUMENTS

| | | | |
|---|---|---|---|
| 8,878,831 B2 | 11/2014 | Tsai | |
| 10,455,653 B1* | 10/2019 | Watanabe | G09G 3/32 |
| 2006/0244695 A1* | 11/2006 | Komiya | G09G 3/006 |
| | | | 345/76 |
| 2007/0182674 A1* | 8/2007 | Fish | G09G 3/3233 |
| | | | 345/76 |
| 2012/0146990 A1 | 6/2012 | Kim | |
| 2013/0069556 A1* | 3/2013 | Wang | G09G 3/3233 |
| | | | 315/240 |
| 2015/0154906 A1 | 6/2015 | Chung | |
| 2015/0379929 A1* | 12/2015 | Zhai | G09G 3/3233 |
| | | | 345/78 |
| 2019/0164500 A1* | 5/2019 | Shi | G09G 3/3258 |
| 2021/0312855 A1* | 10/2021 | Jeong | G09G 3/3233 |
| 2021/0358404 A1* | 11/2021 | Hu | G09G 3/3266 |

FOREIGN PATENT DOCUMENTS

| | | | |
|---|---|---|---|
| CN | 104680969 A | 6/2015 | |
| CN | 106952613 A | 7/2017 | |
| CN | 108470534 A | 8/2018 | |
| CN | 111402803 A * | 7/2020 | ............... G09G 3/32 |
| TW | I409761 B | 9/2013 | |
| TW | 202137171 A | 10/2021 | |

* cited by examiner

*Primary Examiner* — Benjamin X Casarez
(74) *Attorney, Agent, or Firm* — WPAT. P.C

(57) ABSTRACT

A driving circuit includes a first transistor, a capacitor, a second transistor, and a driving transistor. The first transistor is configured to provide a data signal according to a first scan signal. The capacitor is coupled to the first transistor, and the capacitor includes a first terminal and a second terminal. The second transistor is coupled to the first transistor, and the second transistor is configured to provide a start signal according to the data signal. The driving transistor is coupled to the second transistor, and the driving transistor is configured to output a driving signal according to the start signal.

2 Claims, 17 Drawing Sheets

DRIVING CIRCUIT AND DRIVING METHOD

CROSS-REFERENCE TO RELATED APPLICATION

This application claims priority to Taiwan Application Serial Number 111101151, filed Jan. 11, 2022, which is herein incorporated by reference in its entirety.

BACKGROUND

Field of Invention

The present invention relates to a display device and a display method. More particularly, the present invention relates to a driving circuit and a driving method which are applied to light emitting diode display.

Description of Related Art

In response to the current needs of compensation circuits, such as threshold voltage (Vth) compensation or IR drop compensation, and several thin film transistors (TFTs) are often connected in series on the power trace. However, when the circuit is turned on, the current flowing through each component will generate a voltage drop, which will increase the power loss invisibly.

In order to control the duty ratio of the traditional circuit structure, in addition to the driving transistor, an Emission thin film transistor (EM TFT) is additionally configured on the current path of the light emitting diode to control the lighting time of the light emitting diode. But the increased EM TFT will increase the loss of power (Power).

SUMMARY

This summary is intended to provide a simplified abstract of the disclosure to provide the reader with a basic understanding of the present disclosure. This summary is not an exhaustive overview of the disclosure, and it is not intended to identify key/critical elements of the present embodiments or to delimit the scope of the present disclosure.

The present disclosure provides a driving circuit. The driving circuit comprises a first transistor, a capacitor, a second transistor, and a driving transistor. The first transistor is configured to provide a data signal according to a first scan signal. The capacitor is coupled to the first transistor, and the capacitor comprises a first terminal and a second terminal. The second transistor is coupled to the first transistor, and the second transistor is configured to provide a start signal according to the data signal. The driving transistor is coupled to the second transistor, and the driving transistor is configured to output a driving signal according to the start signal.

The present disclosure provides a driving method. The driving method comprises following steps: providing a data signal according to a first scan signal by a first transistor; providing a start signal according to the data signal by a second transistor; and outputting a driving signal according to the start signal by a driving transistor.

Therefore, according to the technical content of the present disclosure, the driving circuit and the driving method shown in the embodiment of the present disclosure can reduce the components on the current path to reduce the overall power loss, and the driving circuit shown in the embodiment of the present disclosure can also eliminate the influence of the threshold voltage (Vth) variation or the IR drop variation.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

Figure 1:
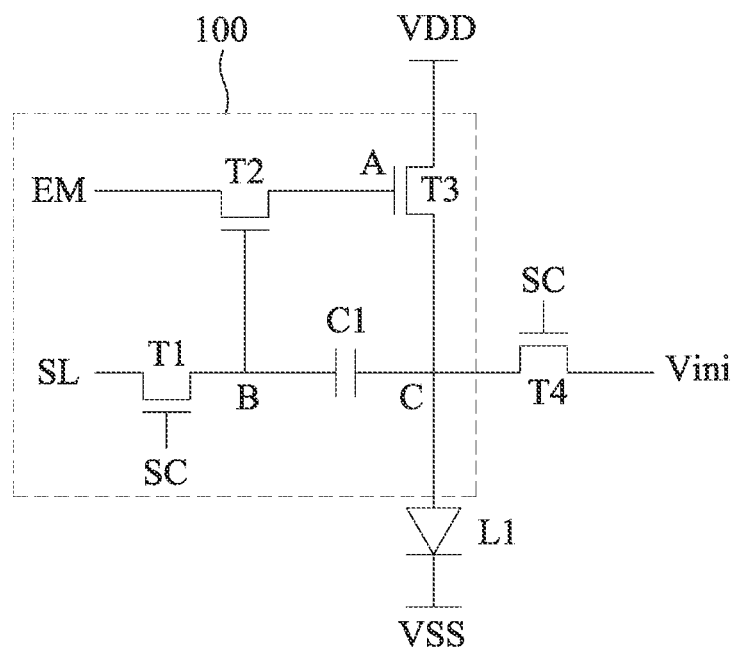
FIG. 1 is a detailed circuit diagram of a driving circuit according to one embodiment of the present disclosure.

In accordance with customary practice, the various features and elements in the drawings are not drawn to scale, but are drawn in a manner that best represents the specific features and elements relevant to the present disclosure. Furthermore, among the different drawings, similar elements/components are referred to by the same or similar reference numerals.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

In order to make the description of the present disclosure more detailed and complete, the following provides an illustrative description for the implementation aspect and specific embodiments of the present case; but this is not the only form of implementing or using the specific embodiments of the present disclosure. The features of various specific embodiments as well as the method steps and sequences for constructing and operating these specific embodiments are encompassed in the detailed description. However, other specific embodiments may also be utilized to achieve the same or equivalent function and sequence of steps.

Unless otherwise defined in this specification, the scientific and technical terms used herein have the same meanings as understood and commonly used by those with ordinary knowledge in the technical field to which this case belongs. In addition, without conflicting with the context, the singular noun used in this specification covers the plural form of the noun; and the plural noun used also covers the singular form of the noun.

In addition, as used herein, "coupled" may mean that two or more elements are in direct physical or electrical contact with each other, or are in indirect physical or electrical contact with each other, and may also mean that two or more elements operate with each other or action.

FIG. 1 is a detailed circuit diagram of a driving circuit according to one embodiment of the present disclosure. As shown in the figure, the driving circuit 100 includes a first transistor T1, a capacitor C1, a second transistor T2, and a driving transistor T3. The capacitor C1 includes a first terminal and a second terminal. On the connection relationship, the capacitor C1 is coupled to the first transistor T1, the second transistor T2 is coupled to the first transistor T1, and the driving transistor T3 is coupled to the second transistor T2.

In order to reduce the components on the current path, the present disclosure provides a detailed description of an operation of the driving circuit 100 shown in FIG. 1 as below.

In one embodiment, the first transistor T1 is configured to provide a data signal SL according to a first scan signal SC. Then, the second transistor T2 is configured to provide a start signal EM according to the data signal SL. Subsequently, the driving transistor T3 is configured to output a driving signal according to the start signal EM.

In one embodiment, the driving circuit 100 further includes a third transistor T4 and a light emitting diode L1. The light emitting diode L1 includes an anode terminal. On the connection relationship, the third transistor T4 is coupled to the capacitor C1, and the anode terminal is coupled to the driving transistor T3.

In operation, the third transistor T4 is configured to provide an initial signal Vini according to the first scan signal SC. Then, the light emitting diode L1 is configured to receive the driving signal to emit light.

Figure 2:
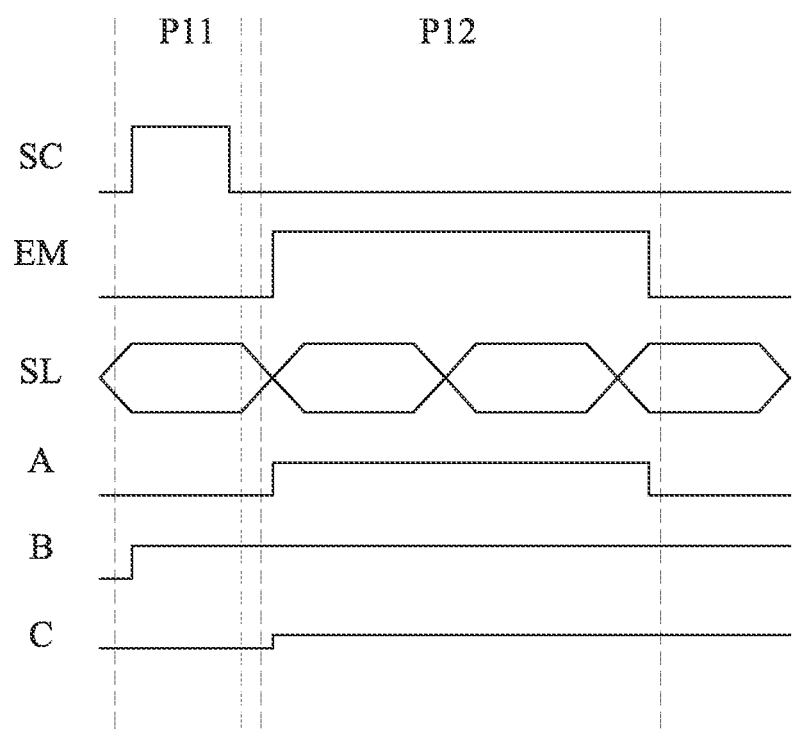
FIG. 2 is a schematic diagram of a waveform of a plurality of control signal levels according to one embodiment of the present disclosure.
Figure 3:
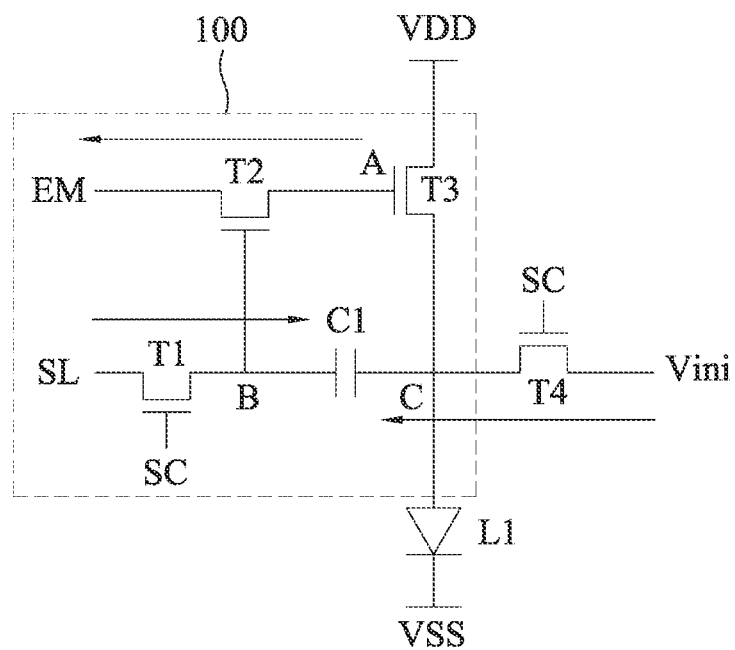
FIGS. 3~4 are operation schematic diagrams of the driving circuit shown in FIG. 1 according to one embodiment of the present disclosure.
Figure 4:
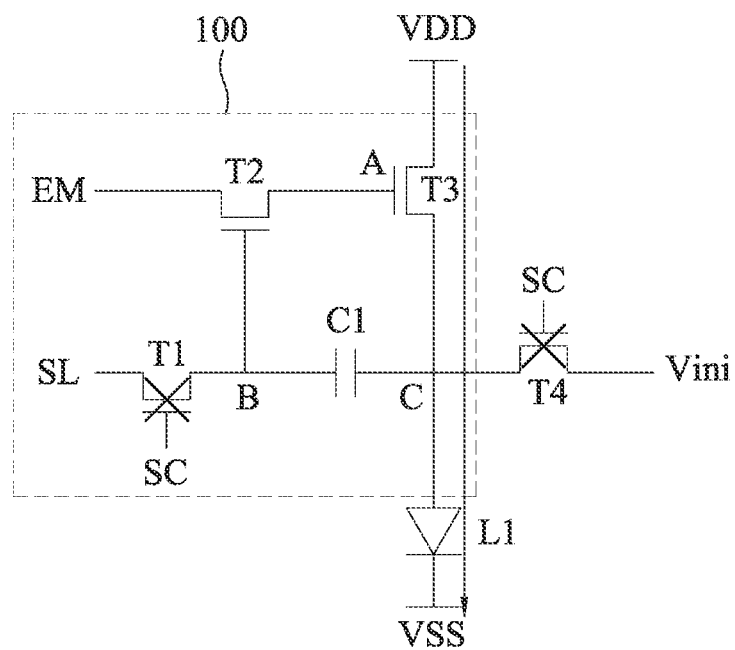

In order to make the above operation of the driving circuit 100 easy to understand, please refer to FIG. 2 and FIG. 4 together. FIG. 2 is a schematic diagram of a waveform of a plurality of control signal levels according to one embodiment of the present disclosure. FIGS. 3~4 are operation schematic diagrams of the driving circuit shown in FIG. 1 according to one embodiment of the present disclosure.

Please refer to FIG. 2 and FIG. 3 together, in one embodiment, during a first period P11, the capacitor C1 stores the data signal SL and the initial signal Vini in the first terminal (such as the terminal B) and the second terminal (such as the terminal C) respectively according to the first scan signal SC. For example, the data signal SL can be the data signal Vdata, the first terminal (such as the terminal B) of the capacitor C1 can write and store the data signal Vdata, the second terminal (such as the terminal C) of the capacitor C1 can write and store the initial signal Vini, but the present disclosure is not limited to this embodiment.

In addition, in one embodiment, during the first period P11, a voltage written by the terminal A is the start signal EM. For example, the start signal EM can be the low signal Vgl, and the voltage written by the terminal A is the low signal Vgl, but the present disclosure is not limited to this embodiment.

Please refer to FIG. 2 and FIG. 4 together, in one embodiment, during a second period P12, the capacitor C1 stores a first compensation signal and a sum of a pull-down signal VSS and a light emitting diode signal in the first terminal (such as the terminal B) and a second terminal (such as the terminal C) respectively according to the start signal EM, and the first compensation signal is formed by a sum of the pull-down signal VSS of the second terminal (such as the terminal C) and the light emitting diode signal through an electrical coupling of the capacitor C1. For example, the data signal SL can be the data signal Vdata, the light emitting diode signal can be VLED, and the second terminal (such as the terminal C) the capacitor C1 can write and store VSS+VLED. A voltage of the second terminal (such as the terminal C) is changed from Vini to VSS+VLED, and a change of a voltage value of the second terminal (such as the terminal C) is coupled to the first terminal (such as the terminal B) of the capacitor C1. Therefore, the first compensation signal which is stored in the first terminal (such as the terminal B) is Vdata+VSS+VLED−Vini, but the present disclosure is not limited to this embodiment.

Then, the driving transistor T3 outputs the driving signal according to a second compensation signal, and the second compensation signal is a difference between the first compensation signal and a threshold voltage of the second transistor T2. For example, the threshold voltage of the second transistor T2 can be Vth_T2, the second compensation signal which is written to a gate terminal (such as the terminal A) of the driving transistor T3 is a signal which is transmitted through a gate terminal (such as the terminal B) of the second transistor T2. The second compensation signal differs from the first compensation signal by Vth_T2, and the second compensation signal is the difference between the first compensation signal and the threshold voltage Vth_T2 of the second transistor T2, so the second compensation signal is Vdata+VSS+VLED−Vini−Vth_T2, but the present disclosure is not limited to this embodiment.

Subsequently, the light emitting diode L1 is configured to receive the driving signal to emit light. For example, a threshold voltage of the driving transistor T3 can be Vth_T3, and the driving signal can be the driving signal Id. Because the driving signal Id passes through the driving transistor T3, the driving signal Id is Kn×(Vdata+VSS+VLED−Vini−Vth_T2−VSS−VLED−Vth_T3)$^2$, that is, the driving signal Id is Kn×(Vdata−Vini−Vth_T2−Vth_T3)$^2$, a parameter Kn can be a constant, but the present disclosure is not limited to this embodiment.

In addition, when the light emitting diode L1 is configured to receive the driving signal Id to emit light, the driving signal Id is only related to Vdata, Vini, and Vth. Therefore, the driving circuit 100 of the present disclosure can eliminate the influence of the IR drop caused by the variation of the pull-down signal VSS.

Please refer to FIG. 4, in one embodiment, the only element on the current path where the light emitting diode L1 is the driving transistor T3. Therefore, compared with the traditional circuit structure which requires an additional start-up thin-film transistor on the current path of the light emitting diode, the present disclosure can effectively reduce the components on the current path of the light emitting diode, thereby reducing the power loss, but the present disclosure is not limited to this embodiment.

Please refer to FIG. 1, FIG. 3, and FIG. 4, in one embodiment, a plurality of transistors which is disclosed in the figures include N-type transistors. For example, the plurality of transistors which is disclosed in the figures can be implemented by including any suitable type of N-type transistors, such as N-type Thin-film Transistor (TFT) or N-type Metal-Oxide-Semiconductor Field Effect Transistor (MOSFET), etc., but the present disclosure is not limited to this embodiment.

Figure 5:
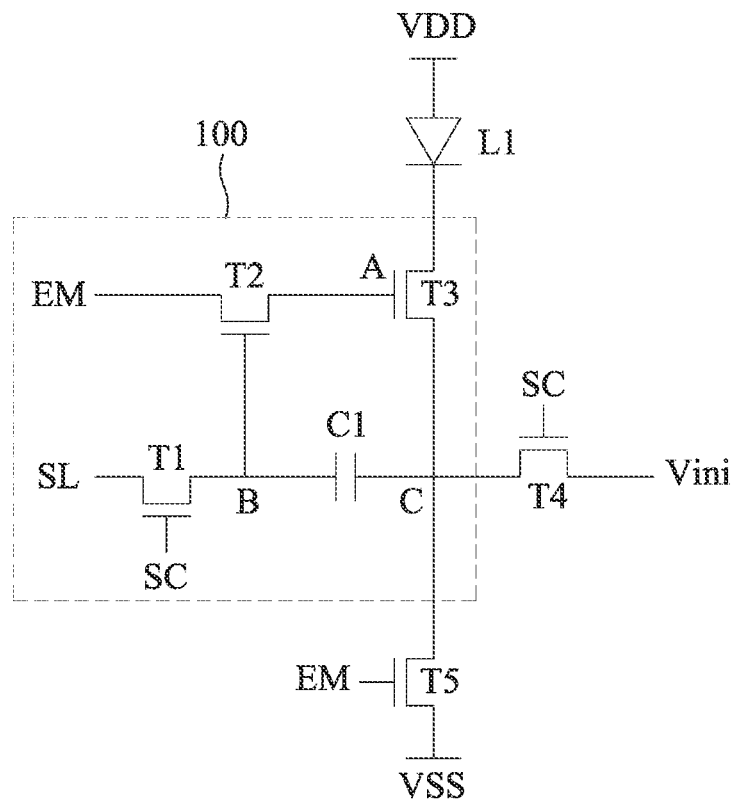
FIG. 5 is a detailed circuit diagram of a driving circuit according to one embodiment of the present disclosure.

FIG. 5 is a detailed circuit diagram of a driving circuit according to one embodiment of the present disclosure. Please refer to FIG. 5, in one embodiment, the driving circuit 100 further includes a third transistor T4 and a light emitting diode L1. The light emitting diode L1 includes a cathode terminal. On the connection relationship, the third transistor T4 is coupled to the capacitor C1, and the cathode terminal is coupled to the driving transistor T3.

In operation, the third transistor T4 is configured to provide an initial signal Vini according to the first scan signal SC. Then, the light emitting diode L1 is configured to receive the driving signal to emit light.

Please refer FIG. 5, in one embodiment, the driving circuit 100 further includes a fourth transistor T5. On the connection relationship, the fourth transistor T5 is coupled to the capacitor C1. In operation, the fourth transistor T5 is configured to provide a pull-down signal VSS according to the start signal EM.

Figure 6:
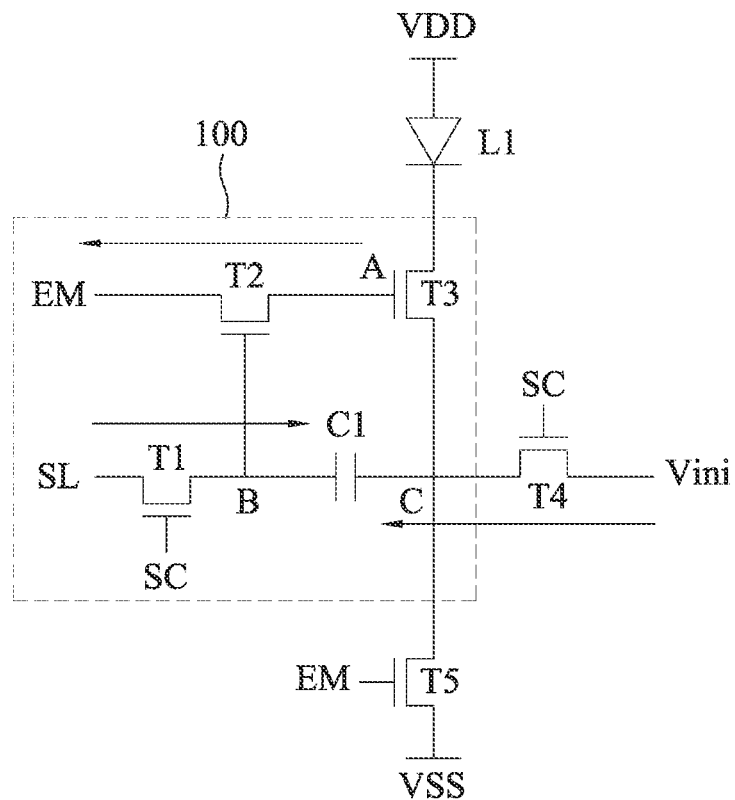
FIGS. 6~7 are operation schematic diagrams of the driving circuit shown in FIG. 5 according to one embodiment of the present disclosure.
Figure 7:
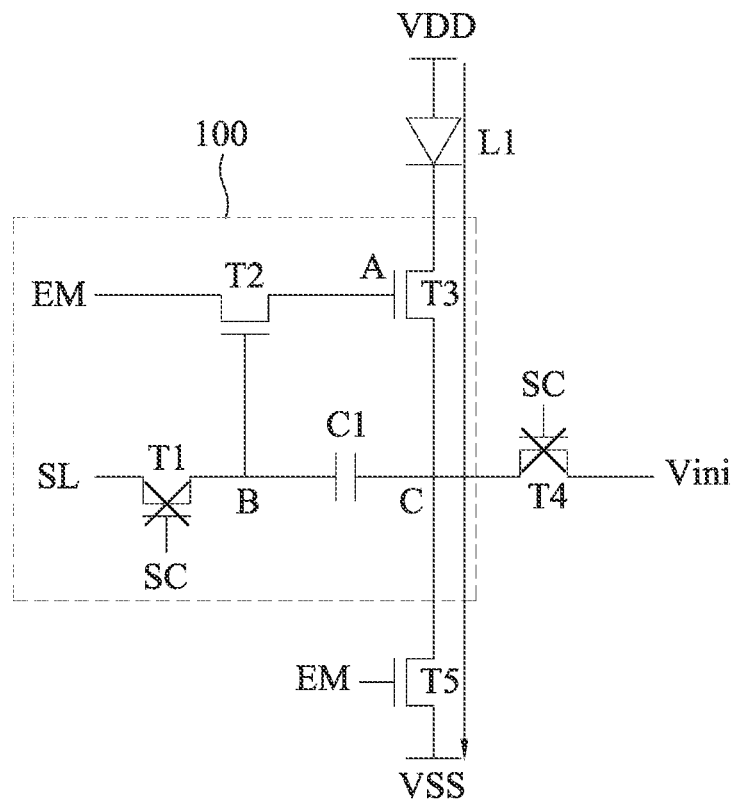

In order to make the above-mentioned operation of the driving circuit 100 easy to understand, please refer to FIG. 2, and FIGS. 6~7. FIGS. 6~7 are operation schematic diagrams of the driving circuit shown in FIG. 5 according to one embodiment of the present disclosure.

Please refer to FIG. 2 and FIG. 6, in one embodiment, during a first period P11, the capacitor C1 stores the data signal SL and the initial signal Vini in the first terminal (such as the terminal B) and the second terminal (such as the terminal C) respectively according to the first scan signal SC. For example, the data signal SL can be the data signal Vdata, the first terminal (such as the terminal B) of the capacitor C1 can write and store the data signal Vdata, and the second terminal (such as the terminal C) of the capacitor C1 can write and store the initial signal Vini, but the present disclosure is not limited to this embodiment.

In addition, in one embodiment, during the first period P11, a voltage written by the terminal A is the start signal EM. For example, the start signal EM can be the low signal Vgl, and the voltage written by the terminal A is the low signal Vgl, but the present disclosure is not limited to this embodiment.

Please refer to FIG. 2 and FIG. 7, in one embodiment, during a second period P12, the capacitor C1 stores a first compensation signal and a pull-down signal VSS in the first terminal (such as the terminal B) and the second terminal (such as the terminal C) respectively according to the start signal EM, and the first compensation signal is formed by the pull-down signal VSS of the second terminal (such as the terminal C) through the electrical coupling of the capacitor C1. For example, the second terminal (such as the terminal C) of the capacitor C1 can write and store the pull-down signal VSS. The voltage of the second terminal (such as the terminal C) is changed from Vini to VSS, and a change of a voltage value of the second terminal (such as the terminal C) is coupled to the first terminal (such as the terminal B) of the capacitor C1. Therefore, the first compensation signal which is store in the first terminal (such as the terminal B) is Vdata+VSS−Vini, but the present disclosure is not limited to this embodiment.

Then, the driving transistor T3 outputs the driving signal according to a second compensation signal, and the second compensation signal is a difference between the first compensation signal and a threshold voltage of the second transistor T2. For example, the driving signal can be the driving signal Id, the threshold voltage of the second transistor T2 can be Vth_T2, the second compensation signal of a gate terminal (such as the terminal A) of the driving transistor T3 is a signal which is transmitted through a gate terminal of the second transistor T2. The second compensation signal differs from the first compensation signal by Vth_T2, and the second compensation signal is the difference between the first compensation signal and the threshold voltage of the second transistor T2, therefore, the second compensation signal is Vdata+VSS−Vini−Vth_T2, but the present disclosure is not limited to this embodiment.

Subsequently, the light emitting diode L1 is configured to receive the driving signal to emit light. A threshold voltage of the driving transistor T3 can be Vth_T3, and the driving signal can be the driving signal Id. Because the driving signal Id passes through the driving transistor T3, the driving signal Id is Kn×(Vdata+VSS−Vini−Vth_T2−VSS−VLED−Vth_T3)$^2$, that is, the driving signal Id is Kn×(Vdata−Vini−Vth_T2−Vth_T3)$^2$, the parameter Kn can be the constant, but the present disclosure is not limited to this embodiment.

In addition, when the light emitting diode L1 is configured to receive the driving signal Id to emit light, the driving signal Id is only related to Vdata, Vini, and Vth. Therefore, the driving circuit 100 of the present disclosure can eliminate the influence of the IR drop caused by the variation of the pull-down signal VSS.

Please refer to FIG. 7, in one embodiment, the traditional circuit structure requires an additional start-up thin-film transistor on the current path of the light emitting diode, and the start-up thin-film transistor of the present disclosure is T2. However, the start-up thin-film transistor T2 is coupled to a gate terminal (such as the terminal A) of the driving transistor T3, so the start-up thin-film transistor T2 of the present disclosure is not on the path of the light emitting diode L1. Therefore, the present disclosure can effectively reduce the components on the current path of the light emitting diode, thereby reducing the power loss, but the present disclosure is not limited to this embodiment.

Please refer to FIG. 5 to FIG. 7, in one embodiment, a plurality of transistors which is disclosed in the figures include N-type transistors. For example, the plurality of transistors which is disclosed in the figures can be implemented by including any suitable type of N-type transistors, such as N-type Thin-film Transistor (TFT) or N-type Metal-Oxide-Semiconductor Field Effect Transistor (MOSFET), etc., but the present disclosure is not limited to this embodiment.

Figure 8:
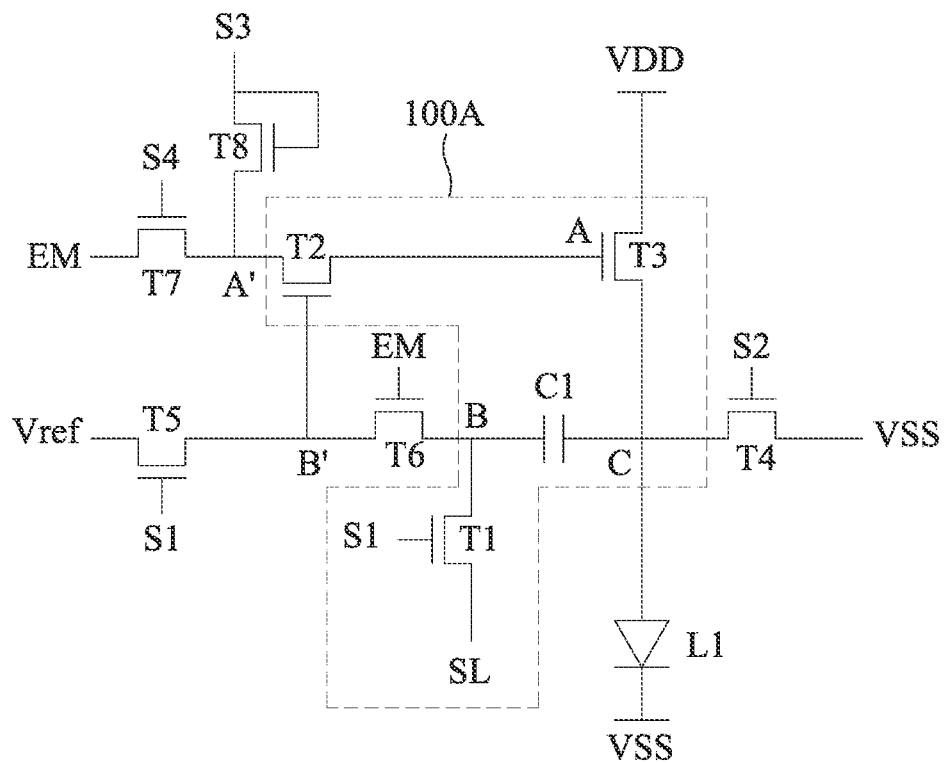
FIG. 8 is a detailed circuit diagram of a driving circuit according to one embodiment of the present disclosure.

FIG. 8 is a detailed circuit diagram of a driving circuit according to one embodiment of the present disclosure. Please refer to FIG. 8, in one embodiment, the driving circuit 100A further includes a third transistor T4 and a light emitting diode L1. The light emitting diode L1 includes an anode terminal. On the connection relationship, the third transistor T4 is coupled to the capacitor C1.

In operation, the third transistor T4 is configured to provide a pull-down signal VSS according to a second scan signal S2. Then, the light emitting diode L1 is configured to receive the driving signal to emit light.

In one embodiment, the driving circuit 100A further includes a fourth transistor T5. On the connection relationship, the fourth transistor T5 is coupled to the second transistor T2. In operation, the fourth transistor T5 is configured to provide a reference signal Vref according to the first scan signal S1.

In one embodiment, the driving circuit 100A further includes a fifth transistor T6. On the connection relationship, the fifth transistor T6 is coupled to the fourth transistor T5. In operation, the fifth transistor T6 is configured to provide the reference signal Vref according to the start signal EM.

In one embodiment, the driving circuit 100A further includes a sixth transistor T7. On the connection relationship, the sixth transistor T7 is coupled to the second transistor T2. In operation, the sixth transistor T7 is configured to provide the start signal EM according to a third scan signal S4.

In one embodiment, the driving circuit 100A further includes a seventh transistor T8. On the connection relationship, the seventh transistor T8 is coupled to the second transistor T2. In operation, the seventh transistor T8 is configured to provide a fourth scan signal S3 according to the fourth scan signal S3.

Figure 9:
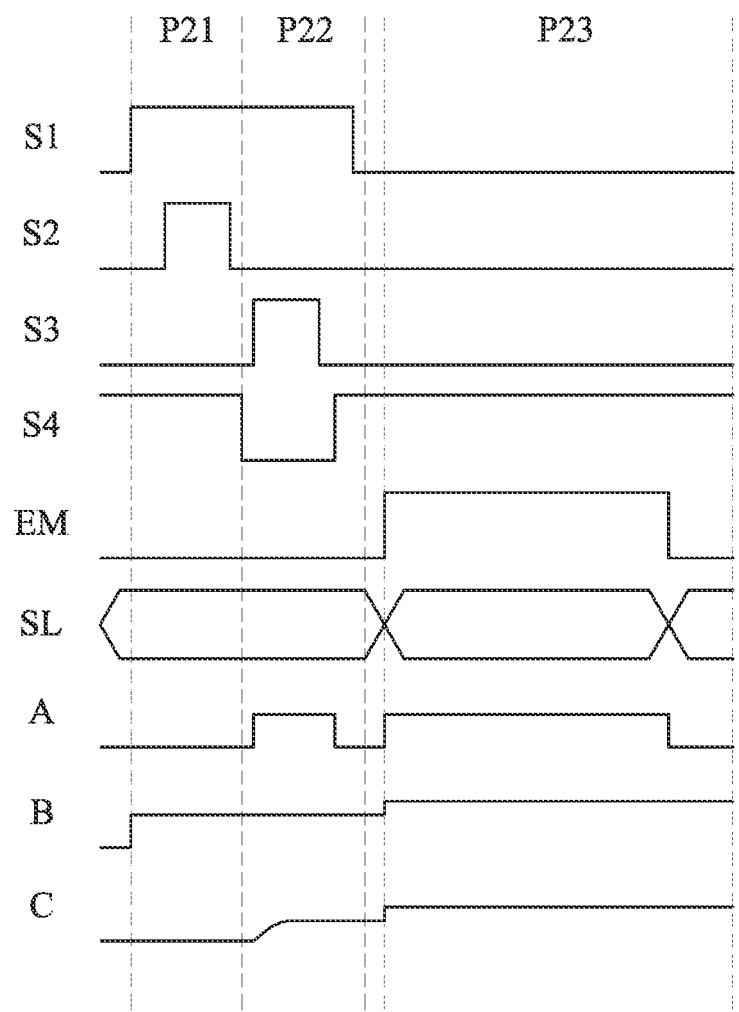
FIG. 9 is a schematic diagram of a waveform of a plurality of control signal levels according to one embodiment of the present disclosure.
Figure 10:
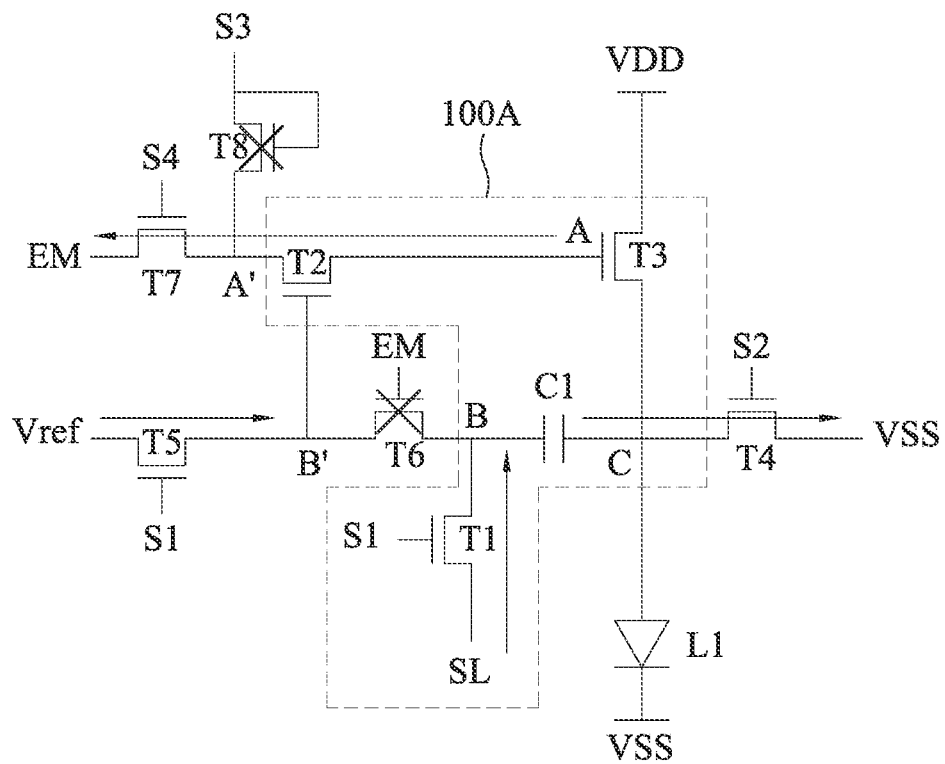
FIGS. 10~12 are operation schematic diagrams of the driving circuit shown in FIG. 8 according to one embodiment of the present disclosure.
Figure 11:
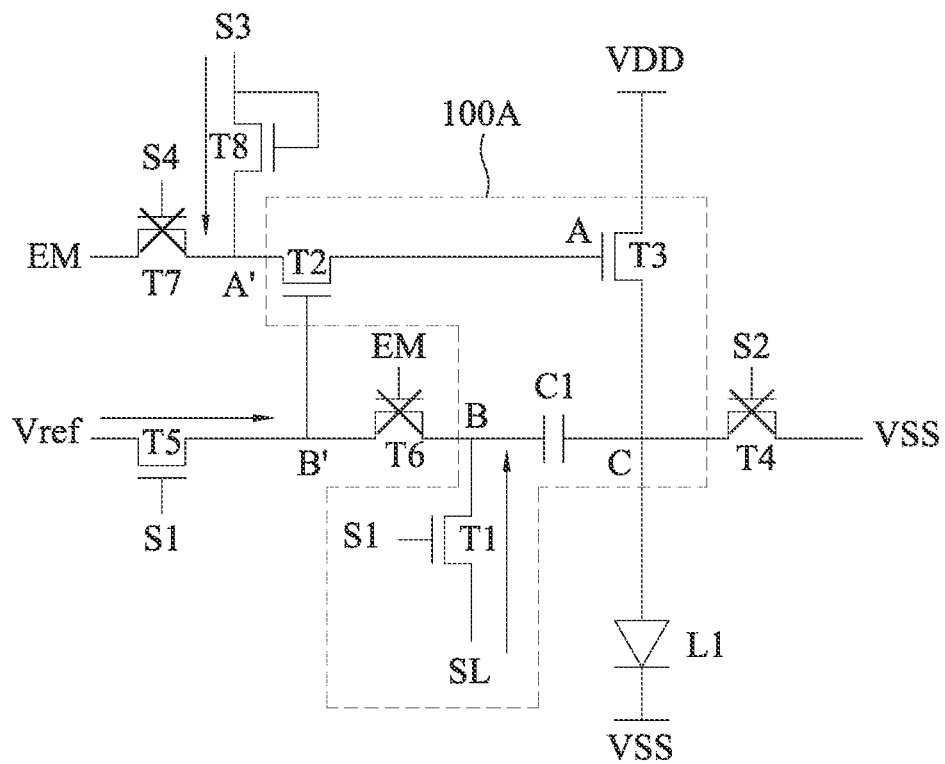
Figure 12:
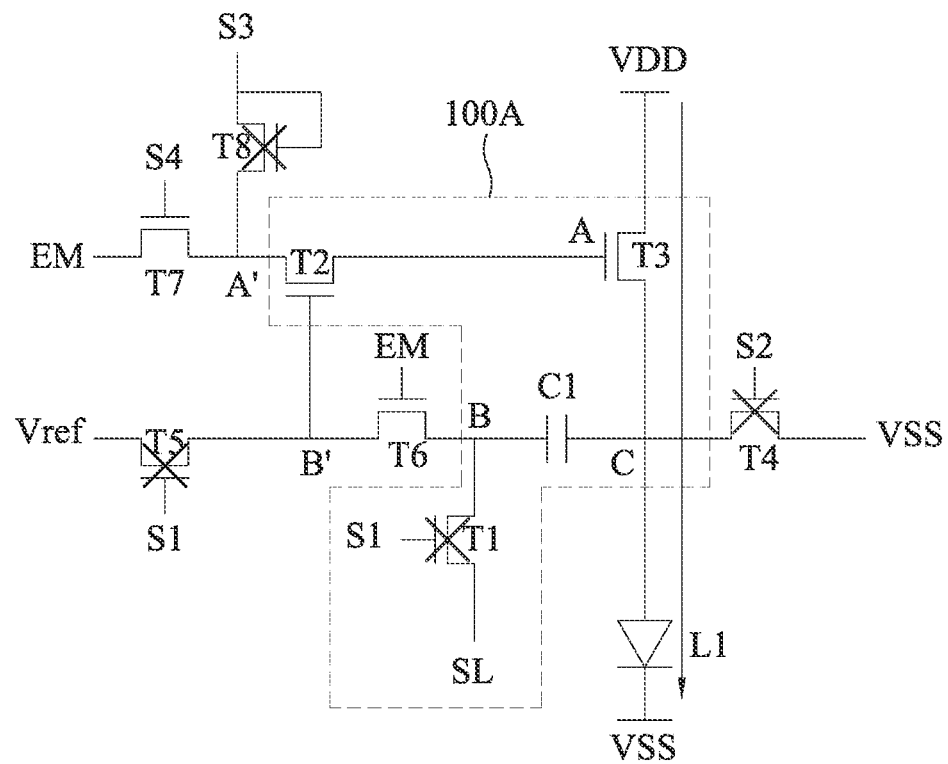

In order to make the above-mentioned operation of the driving circuit 100A easy to understand, please refer to FIG. 9 to FIG. 12 together. FIG. 9 is a schematic diagram of a waveform of a plurality of control signal levels according to one embodiment of the present disclosure. FIGS. 10~12 are operation schematic diagrams of the driving circuit shown in FIG. 8 according to one embodiment of the present disclosure.

Please refer to FIG. 9 and FIG. 10, in one embodiment, during a first period P21, the capacitor C1 stores the data signal SL and the pull-down signal VSS in first terminal (such as the terminal B) and second terminal (such as the terminal C) respectively according to the first scan signal S1 and the second scan signal S2. For example, the data signal SL can be the data signal Vdata, the first terminal (such as the terminal B) of the capacitor C1 can write and store the data signal Vdata, the second terminal (such as the terminal C) of the capacitor C1 can write and store the pull-down signal VSS, but the present disclosure is not limited to this embodiment.

In addition, in one embodiment, during a first period P21, a voltage written by the terminal A' is the start signal EM, a voltage written by a gate terminal (such as the terminal A) of the driving transistor T3 is the start signal EM, a signal written by a terminal B' is the reference signal Vref. For example, the start signal EM can be the low signal Vgl, the voltage written by the terminal A' is the low signal Vgl, and the voltage written by a gate terminal (such as the terminal A) of the driving transistor T3 is the low signal Vgl, but the present disclosure is not limited to this embodiment.

Please refer to FIG. 9 and FIG. 11, in one embodiment, during a second period P22, the capacitor C1 stores the data signal SL and the first compensation signal in the first terminal and the second terminal respectively according to the first scan signal S1 and the fourth scan signal S3, the first compensation signal is a difference between the reference signal Vref, a first threshold voltage of the second transistor T2, and a second threshold voltage of the driving transistor T3. For example, the data signal SL can be the data signal Vdata, the first terminal (such as the terminal B) of the capacitor C1 can write and store the data signal Vdata, the first threshold voltage of the second transistor T2 can be Vth_T2, and a signal which is written by the terminal B' can be the reference signal Vref. A signal which is written to a gate terminal (such as the terminal A) of the driving transistor T3 is a signal which is transmitted through a gate terminal (such as the terminal B') of the second transistor T2, a signal which is written to the terminal A differs from the signal written to terminal B' by Vth_T2, so the signal which is written to the terminal A is Vref−Vth_T2. A signal written by a terminal C is a signal which is transmitted through the gate terminal (such as the terminal A) of the driving transistor T3, the signal which is written to the terminal A differs from a signal which is written to terminal C by Vth_T3, and the first compensation signal is the difference between the reference signal Vref, the first threshold voltage of the second transistor T2, and the second threshold voltage of the driving transistor T3. Therefore, the first compensation signal which is stored in the second terminal (such as the terminal C) of the capacitor C1 is Vref−Vth_T2−Vth_T3, but the present disclosure is not limited to this embodiment.

In addition, in one embodiment, during the second period P22, a voltage which is written by the terminal A' is the fourth scan signal S3. For example, the fourth scan signal S3 can be a high signal Vgh, and a voltage which is written by the terminal A' is the high signal Vgh, but the present disclosure is not limited to this embodiment.

Please refer to FIG. 9 and FIG. 12, in one embodiment, during a third period P23, the capacitor C1 stores a second compensation signal and a sum of a pull-down signal VSS and a light emitting diode signal in the first terminal (such as the terminal B) and the second terminal (such as the terminal C) respectively according to the fourth scan signal S3 and the start signal EM, and the second compensation signal is formed by a sum of the pull-down signal VSS of the second terminal (such as the terminal C) and the light emitting diode signal through the electrical coupling of the capacitor C1. For example, the data signal SL can be the data signal Vdata, and the light emitting diode signal can be VLED. The second terminal (such as the terminal C) of the capacitor C1 can write and store VSS+VLED, a voltage of the second terminal (such as the terminal C) which is changed from Vref−Vth_T2−Vth_T3 to VSS+VLED, and a change of a voltage value of the second terminal (such as the terminal C) is coupled to the first terminal (such as the terminal B) of the capacitor C1, therefore, the second compensation signal which is stored in the first terminal (such as the terminal B) is Vdata+VSS+VLED−Vref+Vth_T2+Vth_T3, but the present disclosure is not limited to this embodiment.

Then, the driving transistor outputs the driving signal according to the third compensation signal, and the third compensation signal is a difference between the second compensation signal and the first threshold voltage of the second transistor T2. For example, the driving signal can be the driving signal Id, the first threshold voltage of the second transistor T2 can be Vth_T2, the second compensation signal which is stored in the first terminal (such as the terminal B) is Vdata+VSS+VLED−Vref+Vth_T2+Vth_T3, and a signal which is written to terminal B' can be the same as a signal which is written to terminal B, therefore, the signal which is written to terminal B' can be Vdata+VSS+VLED−Vref+Vth_T2+Vth_T3. The third compensation signal which is written in a gate terminal (such as the terminal A) of the driving transistor T3 is a signal which is transmitted through a gate terminal (such as the terminal B') of the second transistor T2, the third compensation signal differs from a signal which is written in the terminal B' by Vth_T2, and the third compensation signal is the difference between the second compensation signal and the first threshold voltage of the second transistor T2. Therefore, the third compensation signal is Vdata+VSS+VLED−Vref+Vth_T3, but the present disclosure is not limited to this embodiment.

Subsequently, the light emitting diode is configured to receive the driving signal to emit light. For example, a threshold voltage of the driving transistor T3 can be Vth_T3, the driving signal can be the driving signal Id. The driving signal Id passes through the driving transistor T3, so the driving signal Id is Kn×(Vdata+VSS+VLED−Vref+Vth_T3−VSS−VLED−Vth_T3)$^2$, that is, the driving signal Id is Kn×(Vdata−Vref)$^2$, a parameter Kn can be a constant, but the present disclosure is not limited to this embodiment.

In addition, in one embodiment, during a third period P23, a voltage which is written in the terminal A' is the start signal EM. For example, the start signal EM can be the high signal Vgh, the voltage which is written in the terminal A' can be the high signal Vgh, but the present disclosure is not limited to this embodiment.

Then, when the light emitting diode L1 is configured to receive the driving signal Id to emit light, the driving signal Id is only related to Vdata and Vref. Therefore, the driving circuit 100A of the present disclosure can eliminate the influence caused by the threshold voltage (Vth) variation or the IR drop variation.

Please refer FIG. 12, in one embodiment, the only element on the current path where the light emitting diode L1 emits light is the driving transistor T3. Therefore, compared with the traditional circuit structure which requires an additional start-up thin-film transistor on the current path of the light emitting diode, the present disclosure can effectively reduce the components on the current path of the light emitting diode, thereby reducing the power loss, but the present disclosure is not limited to this embodiment.

Please refer FIG. 8, and FIG. 10 to FIG. 12, in one embodiment, a plurality of transistors which is disclosed in the figures include N-type transistors. For example, the plurality of transistors which is disclosed in the figures can be implemented by including any suitable type of N-type transistors, such as N-type Thin-film Transistor (TFT) or N-type Metal-Oxide-Semiconductor Field Effect Transistor (MOSFET), etc., but the present disclosure is not limited to this embodiment.

Figure 13:
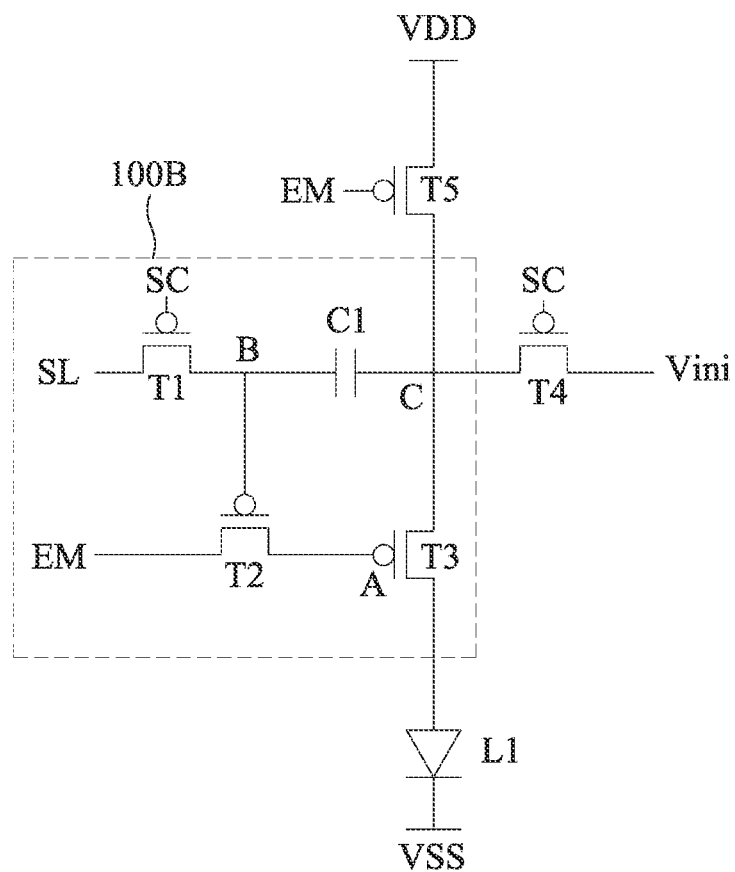
FIG. 13 is a detailed circuit diagram of a driving circuit according to one embodiment of the present disclosure.

FIG. 13 is a detailed circuit diagram of a driving circuit according to one embodiment of the present disclosure. Please refer to FIG. 13, in one embodiment, the driving circuit 100B further includes a third transistor T4 and a light emitting diode L1. The light emitting diode L1 includes an anode terminal. On the connection relationship, the third transistor T4 is coupled to the capacitor C1, and the anode terminal is coupled to the driving transistor T3.

In operation, the third transistor provides the initial signal Vini according to the first scan signal SC, and the light emitting diode L1 is configured to receive the driving signal to emit light.

In one embodiment, the driving circuit 100B further includes a fourth transistor T5. On the connection relationship, the fourth transistor T5 is coupled to the driving transistor T3. In operation, the fourth transistor T5 provides the power signal VDD according to the start signal EM.

Figure 14:
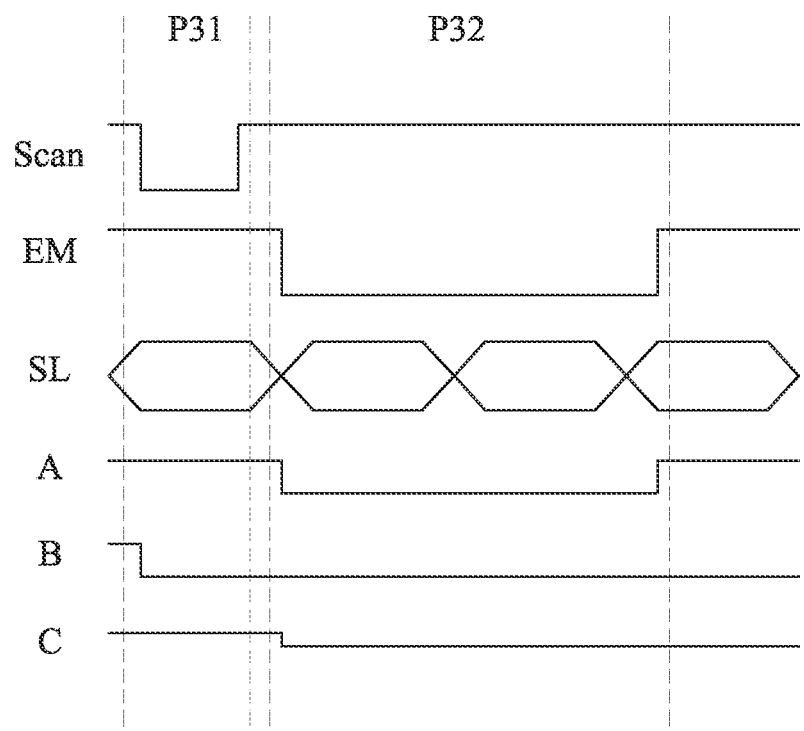
FIG. 14 is a schematic diagram of a waveform of a plurality of control signal levels according to one embodiment of the present disclosure.
Figure 15:
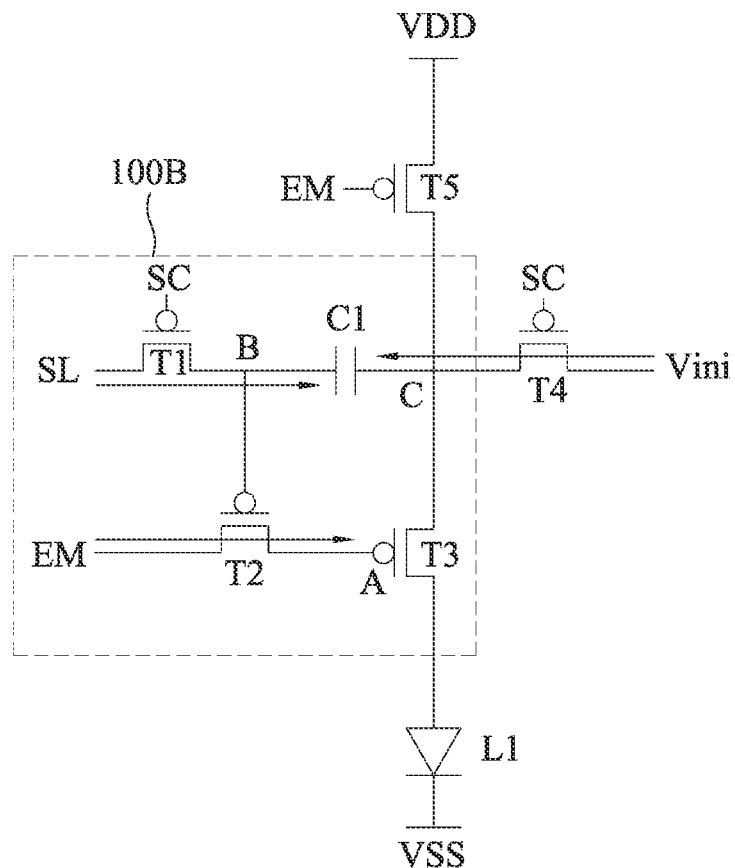
FIGS. 15~16 are operation schematic diagrams of the driving circuit shown in FIG. 13 according to one embodiment of the present disclosure.
Figure 16:
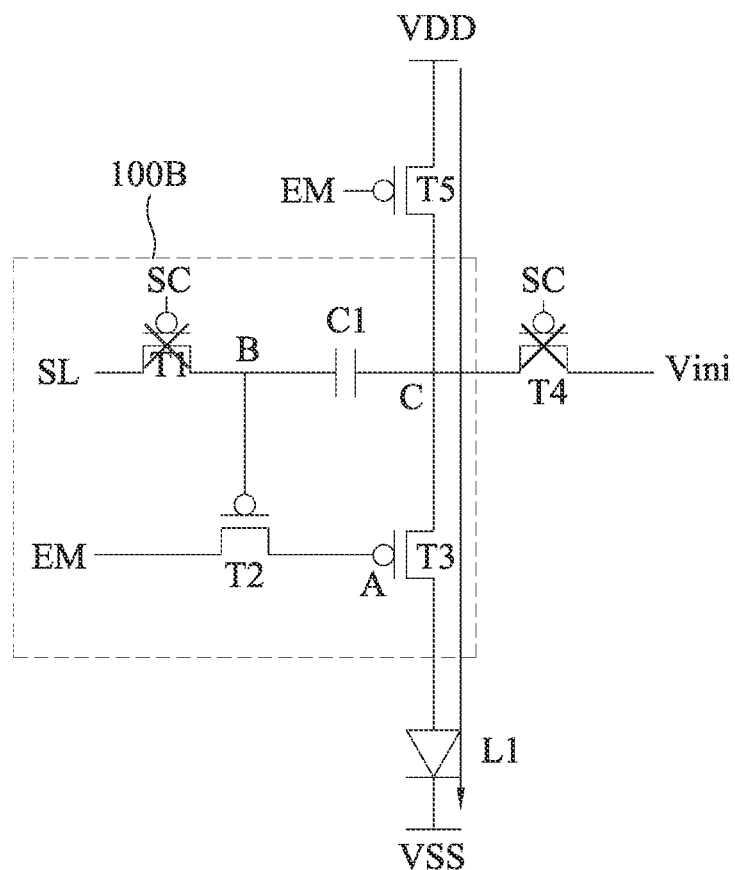

In order to make the above-mentioned operation of the driving circuit 100B easy to understand, please refer to FIG. 14 to FIG. 16. FIG. 14 is a schematic diagram of a waveform of a plurality of control signal levels according to one embodiment of the present disclosure. FIGS. 15~16 are operation schematic diagrams of the driving circuit shown in FIG. 13 according to one embodiment of the present disclosure.

Please refer to FIG. 14 and FIG. 15, in one embodiment, during a first period P31, the capacitor C1 stores the data signal SL and the initial signal Vini in the first terminal (such as the terminal B) and the second terminal (such as the terminal C) respectively according to the first scan signal SC. For example, the data signal SL can be the data signal Vdata, the first terminal (such as the terminal B) of the capacitor C1 can write and store the data signal Vdata, and the second terminal (such as the terminal C) of the capacitor C1 can write and store the initial signal Vini, but the present disclosure is not limited to this embodiment.

In addition, in one embodiment, during a first period P31, a voltage which is written in the terminal A is the start signal EM. For example, the start signal EM can be the high signal Vgh, and the voltage which is written in the terminal A is the high signal Vgh, but the present disclosure is not limited to this embodiment.

Please refer to FIG. 14 and FIG. 16, in one embodiment, during a second period P32, the capacitor C1 stores the first compensation signal and the power signal VDD in the first terminal (such as the terminal B) and the second terminal (such as the terminal C) respectively according to the start signal EM, and the first compensation signal is formed by the power signal VDD of the second terminal (such as the terminal C) through the electrical coupling of the capacitor C1. For example, the second terminal (such as the terminal C) of the capacitor C1 can write and store the power signal VDD. A voltage of the second terminal (such as the terminal C) is changed from Vini to VDD, and a change of a voltage value of the second terminal (such as the terminal C) is coupled to the first terminal (such as the terminal B) of the capacitor C1. Therefore, the first compensation signal which is store in the first terminal (such as the terminal B) is Vdata+VDD−Vini, but the present disclosure is not limited to this embodiment.

Then, the driving transistor T3 outputs the driving signal according to the second compensation signal, and the second compensation signal is a sum of the first compensation signal and a threshold voltage of the second transistor T2. For example, the driving signal can be the driving signal Id, the threshold voltage of the second transistor T2 can be Vth_T2, and the second compensation signal which is written in a gate terminal (such as the terminal A) of the driving transistor T3 is a signal which is transmitted through a gate terminal (such as the terminal B) of the second transistor T2. The second compensation signal differs from the first compensation signal by Vth_T2, and the second compensation signal is a sum of the first compensation signal and the threshold voltage of the second transistor T2, therefore, the second compensation signal is Vdata+VDD−Vini+Vth_T2, but the present disclosure is not limited to this embodiment.

Subsequently, the light emitting diode L1 is configured to receive the driving signal to emit light. A threshold voltage of the driving transistor T3 can be Vth_T3, the driving signal can be the driving signal Id, and the driving signal Id passes through the driving transistor T3, so the driving signal Id is Kn×(VDD−Vdata−VDD+Vini−Vth_T2−Vth_T3)$^2$, that is, the driving signal Id is Kn×(Vini−Vdata−Vth_T2−Vth_T3)$^2$, a parameter Kn can be a constant, but the present disclosure is not limited to this embodiment.

In addition, when the light emitting diode L1 is configured to receive the driving signal Id to emit light, the driving signal Id is only related to Vdata, Vini, and Vth. Therefore, the driving circuit 100B of the present disclosure eliminates the influence of the IR drop caused by the variation of the power signal VDD.

Please refer to FIG. 16, in one embodiment, the traditional circuit structure requires an additional start-up thin-film transistor on the current path of the light emitting diode, and the start-up thin-film transistor of the present disclosure is T2. However, the start-up thin-film transistor T2 is coupled to a gate terminal (such as the terminal A) of the driving transistor T3, so the start-up thin-film transistor T2 of the present disclosure is not on the path of the light emitting diode L1. Therefore, the present disclosure can effectively reduce the components on the current path of the light emitting diode, thereby reducing the power loss, but the present disclosure is not limited to this embodiment.

Please refer to FIG. 13, FIG. 15, and FIG. 16, in one embodiment, a plurality of transistors which is disclosed in the figures include P-type transistors. For example, the plurality of transistors which is disclosed in the figures can be implemented by including any suitable type of P-type transistors, such as P-type Thin-film Transistor (TFT) or P-type Metal-Oxide-Semiconductor Field Effect Transistor (MOSFET), etc., but the present disclosure is not limited to this embodiment.

Figure 17:
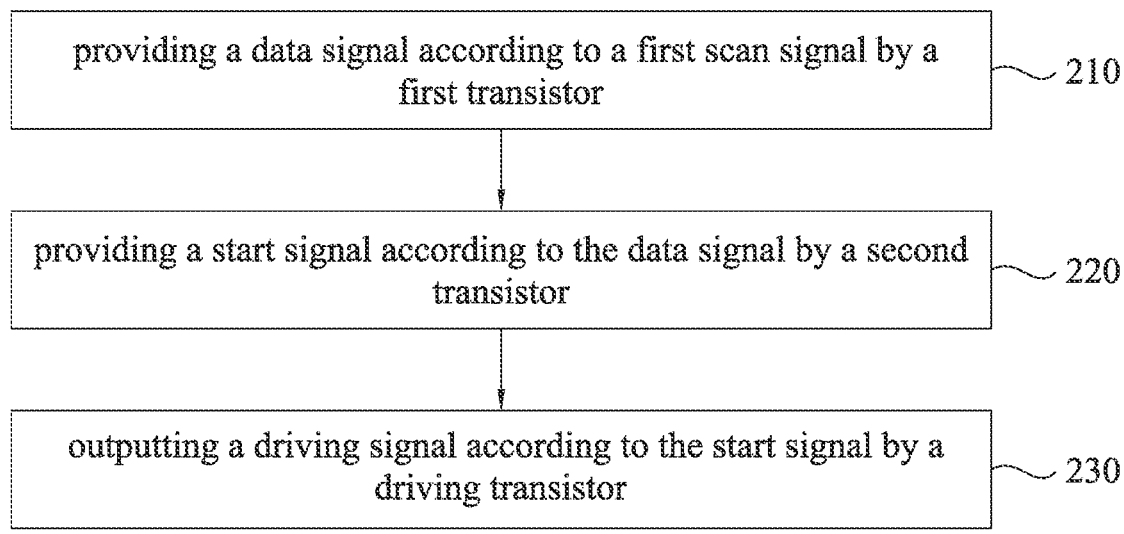
FIG. 17 shows a flowchart of a driving method according to an alternative implementation of the present disclosure.

FIG. 17 shows a flowchart of a driving method according to an alternative implementation of the present disclosure. In order to make the driving method 200 of FIG. 17 easier to understand, please refer to FIG. 1 and FIG. 17 together. The driving method 200 of FIG. 17 includes the following steps:

Step 210: providing a data signal SL according to a first scan signal SC by a first transistor T1;

Step 220: providing a start signal EM according to the data signal SL by a second transistor T2;

Step 230: outputting a driving signal according to the start signal EM by a driving transistor T3.

In one embodiment, please refer to step 210, providing a data signal SL according to a first scan signal SC by a first transistor T1. For example, the first transistor T1 is configured to provide the data signal SL according to the first scan signal SC, but the present disclosure is not limited to this embodiment.

In one embodiment, please refer to step 220, providing a start signal EM according to the data signal SL by a second transistor T2. For example, the second transistor T2 is configured to provide the start signal EM according to the data signal SL, but the present disclosure is not limited to this embodiment.

In one embodiment, please refer to step 230, outputting a driving signal according to the start signal EM by a driving transistor T3. For example, the driving transistor T3 is configured to output the driving signal according to the start signal EM, but the present disclosure is not limited to this embodiment.

It can be seen from the above implementation of the present disclosure that the application of the present disclosure has the following advantages. The driving circuit and the driving method shown in the embodiment of the present disclosure can reduce the components on the current path to reduce the overall power loss, and the driving circuit shown in the embodiment of the present disclosure can also eliminate the influence of the IR drop variation.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A driving circuit, comprising:
a first transistor, configured to provide a data signal according to a first scan signal;
a capacitor, coupled to the first transistor, and comprising a first terminal and a second terminal;
a second transistor, coupled to the first transistor, and configured to provide a start signal according to the data signal;
a driving transistor, coupled to the second transistor, and configured to output a driving signal according to the start signal;
a third transistor, coupled to the capacitor, and configured to provide an initial signal according to the first scan signal; and
a light emitting diode, comprising an anode terminal, wherein the anode terminal is coupled to the driving transistor, wherein the light emitting diode is configured to receive the driving signal to emit light;
wherein during a first period, the capacitor stores the data signal and the initial signal in the first terminal and the second terminal respectively according to the first scan signal;
wherein during a second period, the capacitor stores a first compensation signal and a sum of a pull-down signal and a light emitting diode signal in the first terminal and the second terminal respectively according to the start signal, wherein the first compensation signal is formed by a sum of the pull-down signal of the second terminal and the light emitting diode signal through an electrical coupling of the capacitor, wherein the driving transistor outputs the driving signal according to a second compensation signal, wherein the second compensation signal is a difference between the first compensation signal and a threshold voltage of the second transistor, wherein the light emitting diode is configured to receive the driving signal to emit light.

2. A driving method, comprising:
providing a data signal according to a first scan signal by a first transistor;
providing a start signal according to the data signal by a second transistor;
outputting a driving signal according to the start signal by a driving transistor;
providing an initial signal according to the first scan signal by a third transistor, wherein the third transistor is coupled to a capacitor, wherein the capacitor comprises a first terminal and a second terminal; and
receiving the driving signal to emit light by a light emitting diode, wherein the light emitting diode comprises an anode terminal, wherein the anode terminal is coupled to the driving transistor;
wherein during a first period, the capacitor stores the data signal and the initial signal in the first terminal and the second terminal respectively according to the first scan signal;
wherein during a second period, the capacitor stores a first compensation signal and a sum of a pull-down signal and a light emitting diode signal in the first terminal and the second terminal respectively according to the start signal, wherein the first compensation signal is formed by a sum of the pull-down signal of the second terminal and the light emitting diode signal through an electrical coupling of the capacitor, wherein the driving transistor outputs the driving signal according to a second compensation signal, wherein the second compensation signal is a difference between the first compensation signal and a threshold voltage of the second transistor, wherein the light emitting diode is configured to receive the driving signal to emit light.

* * * * *